United States Patent [19]

Risko

[11] 4,153,273

[45] May 8, 1979

[54] OCCUPANT RESTRAINT CUSHION SYSTEM

[75] Inventor: Richard C. Risko, Sterling Heights, Mich.

[73] Assignee: General Motors Corporation, Detroit, Mich.

[21] Appl. No.: 896,352

[22] Filed: Apr. 14, 1978

[51] Int. Cl.² .............................................. B62D 21/08
[52] U.S. Cl. .................................... 280/740; 280/732; 280/743
[58] Field of Search ............... 280/728, 729, 730, 732, 280/736, 737, 738, 739, 740, 741, 742, 743

[56] References Cited

U.S. PATENT DOCUMENTS

| | | | |
|---|---|---|---|
| 3,514,125 | 5/1970 | Nemecek | 280/732 |
| 3,582,107 | 6/1971 | Goetz | 280/729 |
| 3,625,543 | 12/1971 | Wolff | 280/740 |
| 3,788,665 | 1/1974 | Noll | 280/729 |
| 3,794,346 | 2/1974 | Brockman | 280/740 |
| 3,904,222 | 9/1975 | Bursott | 280/732 |

Primary Examiner—John P. Silverstrim
Attorney, Agent, or Firm—Edward J. Biskup

[57] ABSTRACT

An occupant restraint cushion system including a housing provided with a J-shaped base wall connected to a pair of laterally spaced end walls with one of the end walls having an enlarged circular opening formed therein and the other end wall having an aperture formed therein. A gas generator-diffuser combination is mounted in the opening with a threaded stud fixed with one end of the gas generator extending through the aperture and adapted to have a nut tightened thereon so as to draw the gas generator towards the associated apertured side wall to thereby concentrically locate the gas generator relative to the diffuser and simultaneously clamp portions of the cushion fabric between the gas generator and diffuser to provide the cushion with a sealed compartment.

4 Claims, 9 Drawing Figures

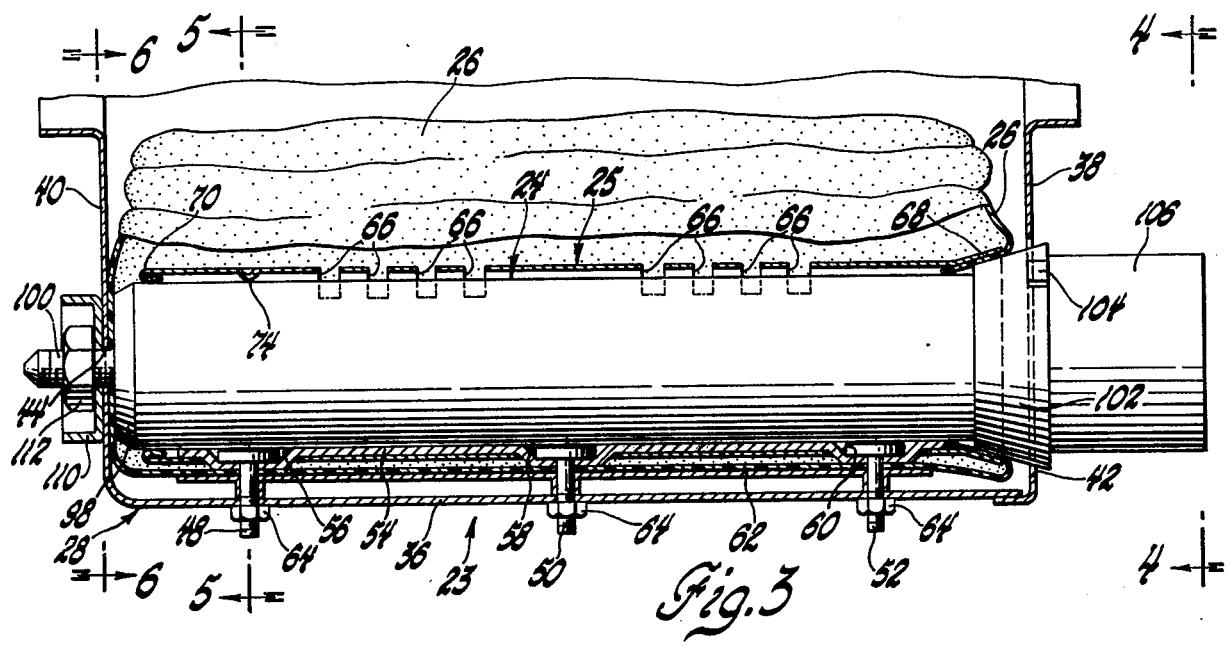
Fig. 3
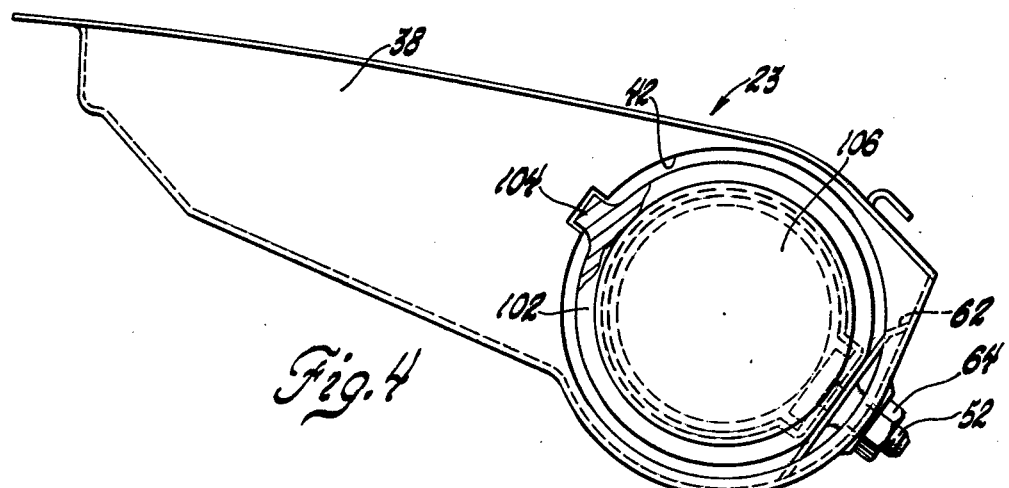
Fig. 4
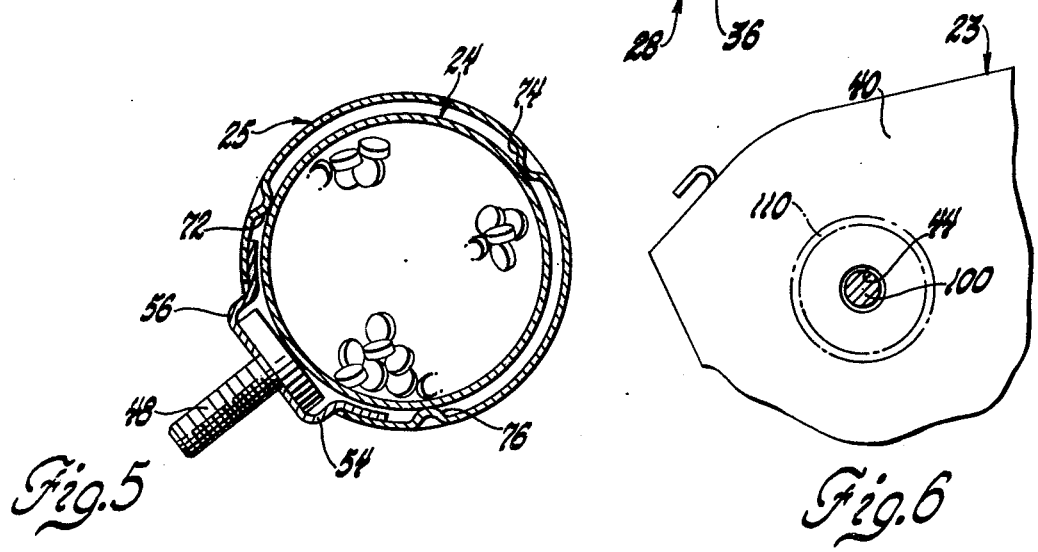
Fig. 5
Fig. 6

OCCUPANT RESTRAINT CUSHION SYSTEM

This invention concerns occupant restraint cushion systems in general and more particularly relates to a restraint cushion assembly that includes a concentrically arranged gas generator-diffuser combination that is mountable in the instrument panel of a vehicle and serves to inflate a cushion upon energization of the gas generator.

More specifically, the occupant restraint cushion system according to the invention comprises an elongated housing adapted to be fixedly mounted in the instrument panel of a motor vehicle. The housing includes a J-shaped base wall connected to first and second laterally spaced end walls with the first end wall having an enlarged opening formed therein and the second end wall being formed with an aperture. An elongated tubular diffuser extends between the end walls and has one end thereof formed with a radially outwardly flared conical portion while the other end of the diffuser is formed with integral guide means. The diffuser is also formed with outwardly projecting stud members which extend through appropriate apertures formed in the base wall of the housing for rigidly connecting the diffuser thereto and causing the conical portion to be located concentrically and in spaced relationship with respect to the enlarged opening in the first end wall and the aperture in the second end wall. A gas generator is positioned in the diffuser and has a threaded stud at one end that extends through the aperture in the second end wall. The other end of the gas generator is formed with an annular tapered flange which is adapted to fit within the conical portion of the diffuser. The arrangement is such that after the diffuser is inserted within a suitable opening formed in a restraint cushion and is rigidly connected to the housing, the gas generator is positioned within the diffuser with the threaded stud passing through the aperture in the second end wall after which a nut is placed on the threaded stud and is tightened causing the annular tapered flange on the gas generator to be drawn towards and cooperate with the conical portion of the diffuser for simultaneously centering the gas generator relative to the diffuser and clamping the fabric of the restraint cushion therebetween.

The objects of the present invention are to provide a new and improved occupant restraint cushion system that includes a cylindrical diffuser supported within a J-shaped housing and having a series of dimples formed in one end and a radially outwardly flared conical portion formed at the other end for cooperation with a conically shaped tapered flange portion of a gas generator for maintaining the latter concentrically within the diffuser while simultaneously clamping an occupant restraint cushion therebetween; to provide a new and improved occupant restraint cushion assembly having a housing that is fixedly mountable in the instrument panel of a motor vehicle and rigidly retains a cylindrical diffuser which accommodates a cylindrical gas generator having a tapered flange at one end formed with a radially extending key that serves to properly locate the gas generator relative to the gas flow openings formed in the diffuser; to provide a new and improved occupant restraint cushion assembly including a gas generator having a threaded stud at one end and a conically shaped head at the other end with the gas generator being concentrically located within a cylindrical diffuser in a manner so as to clamp one portion of an inflatable cushion between the conically shaped head and an outwardly flared portion of the diffuser and clamp another portion of the cushion between the stud end of the gas generator and one side wall of a support housing, and to provide a new and improved method of connecting a restraint cushion to the gas generator and diffuser of an occupant restraint cushion system so as to form a sealed inflatable compartment within the restraint cushion by trapping a portion of the cushion between a conically shaped end of the diffuser and a complimentary shaped portion of the gas generator while simultaneously clamping another portion of the cushion between one end of the gas generator and one wall of the housing supporting the diffuser-gas generator combination.

Other objects and advantages of the invention will be more apparent from the following detailed description when taken with the drawings in which:

FIG. 3 is a sectional view of the occupant restraint cushion assembly taken on line 3—3 of FIG. 2;

FIG. 4 is an elevational view of the occupant restraint cushion assembly taken on line 4—4 of FIG. 3;

FIG. 5 is a sectional view taken on line 5—5 of FIG. 3;

FIG. 6 is a view taken on line 6—6 of FIG. 3;

Figure 1:
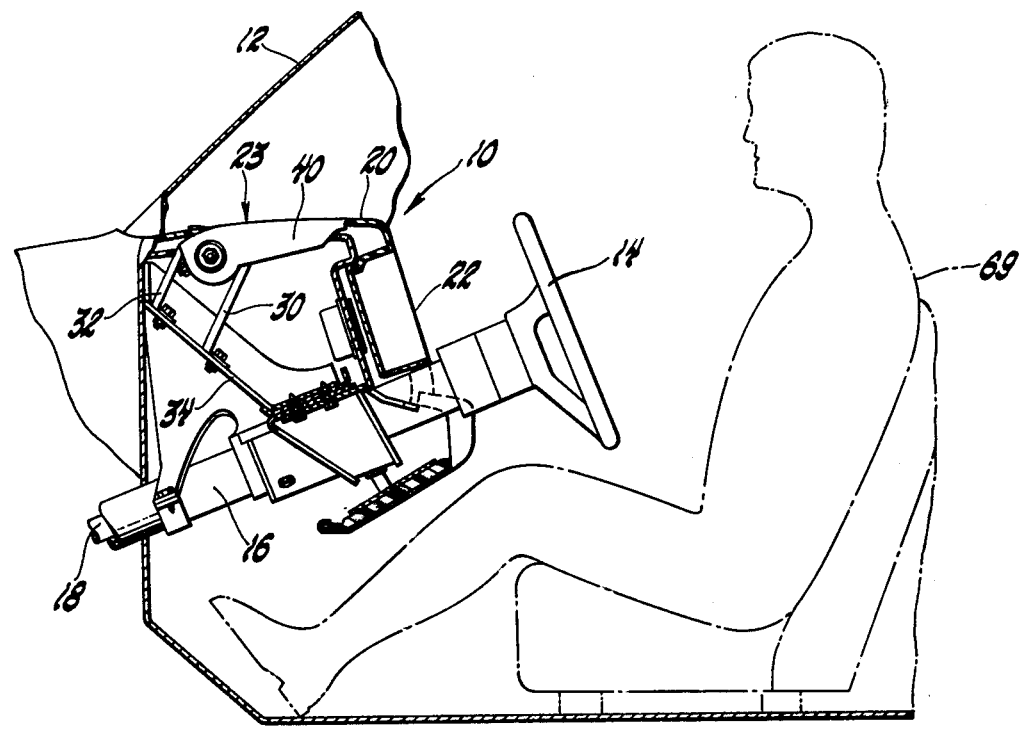
FIG. 1 is a view showing an occupant restraint cushion assembly made in accordance with the invention housed within the upper portion of a motor vehicle instrument panel.

Referring now to the drawings and more particularly to FIG. 1 thereof, the driver's compartment of a vehicle is shown including an instrument panel 10 located adjacent a windshield 12 and provided with a conventional steering wheel 14 rotatably mounted on a steering column 16 that extends through the fire wall and includes a steering shaft 18 for connection with the dirigible wheels of the vehicle. The instrument panel 10 includes an upper surface 20 which faces the windshield 12 and a frontal surface 22 located in generally spaced relationship to the steering wheel 14. An occupant restraint cushion system 23 is located within the upper surface 20 of the instrument panel 10 and, as seen in FIG. 3, includes a cylindrical gas generator 24 and a tubular diffuser 25 positioned within a normally folded restraint cushion 26 that is deployable rearwardly under predetermined conditions. The gas generator-diffuser combination is located in a housing 28 which is secured in position through downwardly extending strut members 30 and 32 to a rigid plate 34 fixed with the steering column 16. Although not shown, a hinged closure made of plastic material or the like normally closes the open top portion of housing 28 and is releasably held against movement upwardly relative to the latter mentioned open top portion until such time as the restraint cushion 26 is deployed.

Figure 2:
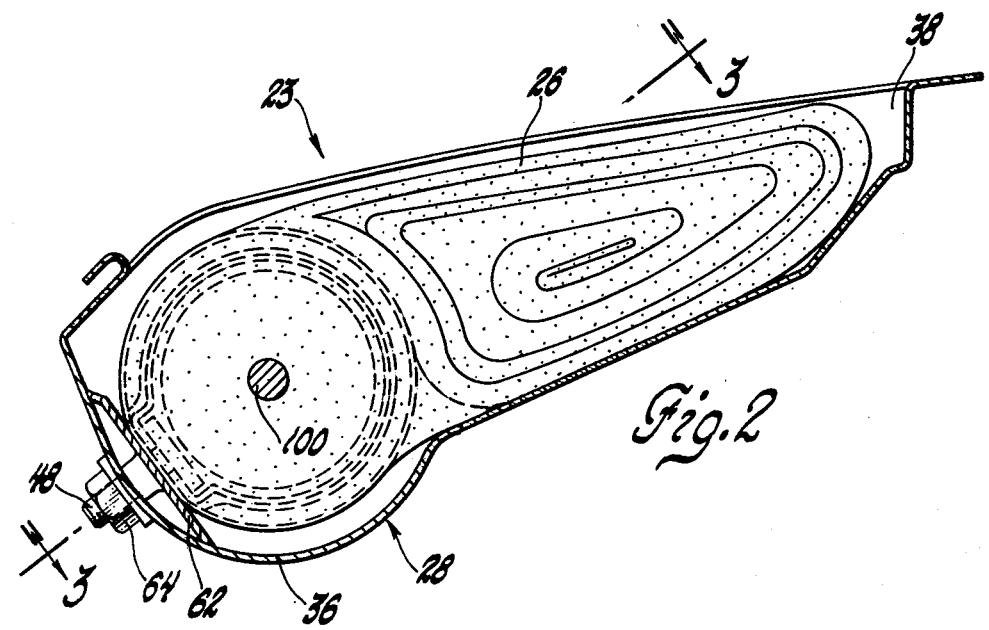
FIG. 2 is an enlarged side elevational view of the occupant restraint cushion assembly shown in FIG. 1 with one side wall removed to reveal the restraint cushion.

As best seen in FIGS. 2-6, the housing 28 comprises a J-shaped base wall 36 which is rigidly connected to a pair of laterally spaced end walls 38 and 40. The end wall 38 has an enlarged circular opening 42 formed therein while the other end wall 40 has an aperture 44 formed therein. The tubular diffuser 25 is positioned within the housing 28 and has three radially extending stud members 48, 50 and 52 fixedly connected thereto. A reinforcing plate 54 extends the length of the diffuser 25 and is welded thereto and is formed with three circular depressions 56, 58 and 60 which extend through similarly shaped openings formed in the diffuser. The depressions 56, 58 and 60 fixedly support the head ends of stud members 48, 50 and 52 respectively and the threaded ends of the latter extend through accommodating apertures formed in the base wall 36 for securing the diffuser in concentric alignment with the opening 42 and the aperture 44 formed in the side walls of the housing. In this connection, it will be noted that a support plate 62 is fixed with the base wall 36 and extends the length thereof so as to provide a flat surface against which the depressions 56, 58 and 60 in the reinforcing plate 54 of the diffuser 25 can abut. Thus, when a nut 64 on each of the stud members 48, 50 and 52 is tightened, the diffuser 25 is positioned within the housing as shown in FIGS. 2, 3 and 4.

The diffuser 25 is formed with the usual axially spaced openings 66 appropriately located so as to provide proper distribution of gases into the compartment area of the restraint cushion 26. In addition, the diffuser 25 has one end formed with an annular radially outwardly flared conical portion 68 concentrically located relative to the circular opening 42 in end wall 38. The other end of the diffuser 25 terminates with an inwardly crimped edge 70 adjacent to which are formed three identical dimples 72, 74 and 76. The latter dimples are equally spaced about the circumference of the diffuser 25 and serve as guide means for the gas generator 24 as will be explained hereinafter.

Figure 7:
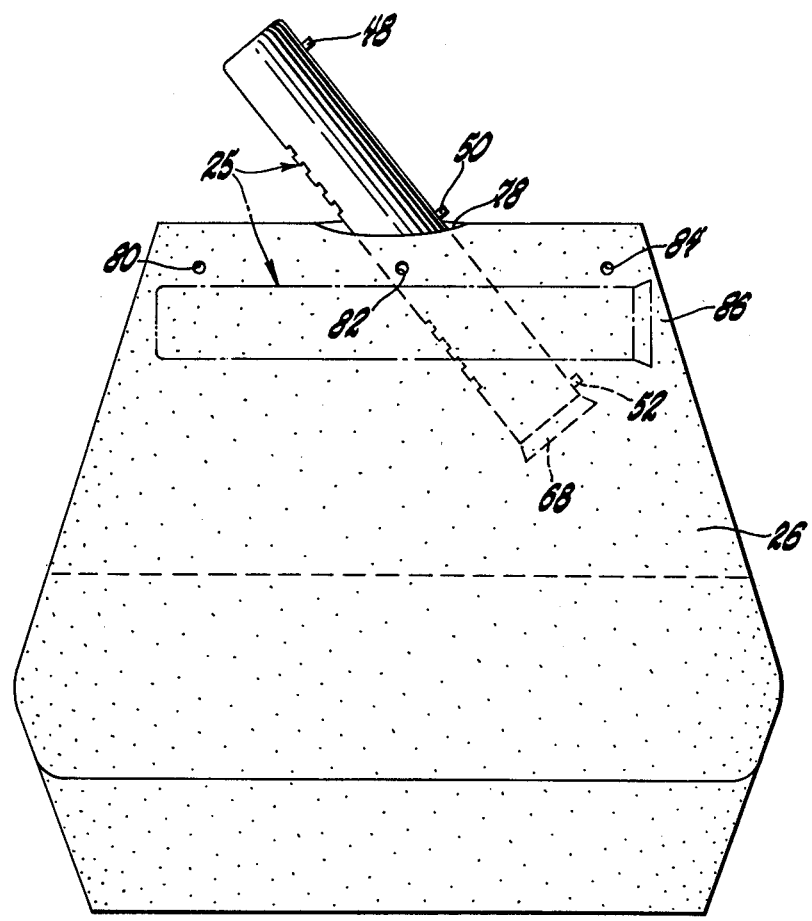
FIG. 7 shows the diffuser of the occupant restraint cushion assembly shown in FIGS. 1-5 being inserted within an opening formed in the restraint cushion.
Figure 8:
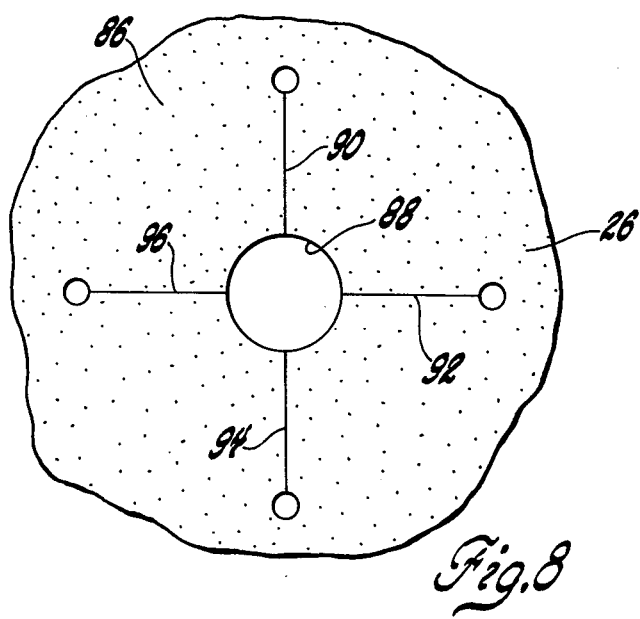
FIG. 8 shows a hole formed in one side of the restraint cushion shown in FIG. 7.

Prior to mounting the diffuser 25 in the housing 28, the diffuser 25 is first inserted within an opening or slit 78 formed in the mounting end of the restraint cushion 26 as seen in FIG. 7, and then is located with its longitudinal axis substantially parallel to stud openings 80, 82 and 84 formed in the restraint cushion. The opening 78 is then closed by sewing or otherwise and the studs 48, 50 and 52 are passed through the openings 80, 82 and 84 respectively so as to locate the conical portion 68 adjacent the side wall 86 of the restraint cushion 26. The side wall 86 of the cushion 26 is provided with a precut circular hole 88, which as seen in FIG. 8, is connected to four slits 90, 92, 94 and 96. The hole 88 is so positioned that when the stud members 48, 50 and 52 are inserted into appropriately located openings 80, 82 and 84 in the cushion 26, the opening in the conical portion 68 is concentrically aligned with the hole 88.

The restraint cushion 26 shown is made of a porous nylon material and is similar in construction to the restraint cushion disclosed in co-pending patent application D-1,644, entitled "Occupant Restraint Cushion" in the name of Ronald Barnett and assigned to the assignee of this invention. When inflated, the restraint cushion 26 is adapted to be deployed rearwardly and have a portion thereof extend downwardly into a position between the driver 69 and the steering wheel 14. For a more complete description of the configuration of the restraint cushion 26 reference is made to the latter mentioned patent application.

The gas generator 24 serves as a source of pressurized gas for inflating the restraint cushion 26. As seen in FIG. 3, the gas generator 24 has a cylindrical body, one end of which is formed with an annular bevel 98 and fixedly supports an axially extending threaded stud 100. The other end of the gas generator 24 is formed with an annular tapered flange or conical portion 102 integrally formed with a radially extending key member 104. The conical portion 102 is integrally formed with an attached cylindrical member 106 which houses the electrical lead-in connectors for initiating firing of the gas generator. Although not shown, suitable openings are provided along the periphery of the gas generator through which the expanding gas flows for appropriate distribution by means of the axially spaced openings 66 formed in the diffuser 25.

Figure 9:
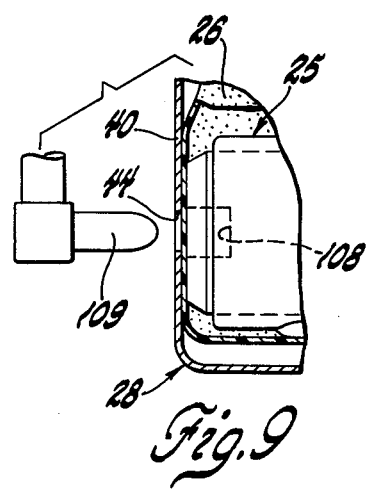
FIG. 9 illustrates a method of forming an opening in the other side of the restraint cushion of FIG. 7.

During assembly of the occupant restraint system 23 and after the diffuser 25 has been positioned within the restraint cushion 26 as explained hereinbefore, the restraint cushion 26 is appropriately folded into a compact package which permits the combination to be positioned within the housing 28 as seen in FIG. 2. In this regard, it will be noted that the stud members 48, 50 and 52 extend through accomodating mounting holes formed in the reinforcing plate 54 and the housing 28. Once the diffuser 25 and restraint cushion 26 are located in the housing 28, the nuts 64 are tightened on each of the studs 48, 50 and 52 resulting in the flared conical portion being positioned adjacent to and concentrically aligned with the enlarged opening 42. A dummy gas generator, which has an outer configuration identical to the gas generator 24 except for the absence of the stud 100, is then inserted through the enlarged opening 42 and through the hole 88 in the restraint cushion 26 to temporarily trap the cushion material around the hole 88 between the portion of the dummy gas generator that corresponds to the conical portion 102 and the outwardly flared portion 68 of the diffuser 25. At the same time, the opposite end of the dummy gas generator traps a portion of the restraint cushion 26 against the end wall 40 and a bore 108 formed in the dummy gas generator registers with the aperture 44 as seen in FIG. 9. A hot probe 109, which is at a temperature sufficient to melt the material of the restraint cushion 26, then enters the aperture 44 and burns a hole through the restraint cushion. The assembly can then be shipped or stored for final assembly with the actual gas generator 24.

During final assembly, the dummy gas generator is removed from the housing 28 and replaced by the gas generator 24. As to the latter, initially the threaded stud 100 of the gas generator 24 moves through the enlarged opening 42 formed in the side wall 38 and through the hole 88 formed in the restraint cushion 26. The continued movement of the gas generator 24 into the diffuser 25 then causes the beveled end thereto to contact the dimples 72, 74 and 76 formed in the diffuser 25 which serve to center the gas generator 24 concentrically with respect to the inner wall of the diffuser 25. The key 104 of the gas generator is located in the notch in end wall 38 so that the gas flow openings in the gas generator are properly positioned relative to the openings 66 in the diffuser 26. The threaded stud 100 of the gas generator 24 then passes through the hot probe formed opening in the restraint cushion and the aperture 44 in side wall 40 of the housing 38. Thereafter washer 110 and a nut 112 is placed on the threaded stud 100 and upon tightening causes a portion of the restraint cushion 26 to be clamped between the beveled end of the gas generator and the side wall 40 of the housing 38. At the same time, the tapered flange or conical portion 102 at the other end of the gas generator 24 serves to clamp and seal the other side wall of the restraint cushion 26. This occurs because of the tapered flange cooperating with the flared portion of the diffuser for clamping therebetween the circumferentially spaced flap members formed by the slits 90, 92, 94 and 96. Thus, in this manner, the restraint cushion 26 is connected to the diffuser 25 and is provided with a sealed arrangement at both ends of the gas generator.

Finally, it will be understood that, as seen in FIG. 8, the flap members formed by the slits 90, 92, 94 and 96 are intended to provide a generally circular hole in the side wall 86 of the restraint cushion. Of course, the diameter of the circular hole should be large enough to allow the gas generator to pass therethrough, as hereinbefore explained, but be less than the maximum diameter of the conical portion 68 of the diffuser 25 so that a sealed arrangement is provided when the conical portions 68 and 102 mate.

Various changes and modifications can be made in this construction without departing from the spirit of the invention. Such changes and modifications are contemplated by the inventor and he does not wish to be limited except by the scope of the appended claims.

The embodiments of the invention in which an exclusive property or privilege is claimed are defined as follows:

1. An occupant restraint system comprising, in combination, an elongated housing adapted to be fixedly mounted on a motor vehicle, said housing including a base wall connected to a pair of laterally spaced end walls, one of said end walls having an enlarged opening formed therein and the other end wall having an aperture formed therein, a restraint cushion having a pair of laterally spaced side walls one of which is formed with a hole, an elongated tubular diffuser located within said restraint cushion and being positioned in the housing between the end walls, one end of said diffuser being formed with a radially outwardly flared conical portion axially aligned with said hole in said restraint cushion, means radially extending from said diffuser and passing through the restraint cushion for rigidly connecting the diffuser to said base wall so as to locate said conical portion of said diffuser concentrically and in spaced relationship with respect to said enlarged opening in said one of said end walls, a gas generator positioned in said tubular diffuser, said gas generator having a threaded stud at one end thereof that extends through the other of said side walls of said restraint cushion and through said aperture in said other end wall of said housing, a conical flange formed at the other end of said gas generator and being located in said hole in the restraint cushion, and a nut on the threaded stud which upon tightening causes the conical flange to be drawn towards and cooperate with said conical portion of the diffuser for clamping the material of the restraint cushion surrounding said hole between said conical flange and said conical portion and providing a seal therebetween.

2. An occupant restraint system comprising, in combination, an elongated housing adapted to be fixedly mounted on a motor vehicle, said housing including a base wall connected to a pair of laterally spaced end walls, one of said end walls having an enlarged opening formed therein and the other end wall having an aperture formed therein, a restraint cushion having a pair of laterally spaced side walls one of which is formed with a plurality of slits so as to define a hole therein, an elongated tubular diffuser located within said restraint cushion and being positioned in the housing between the end walls, one end of said diffuser being formed with a radially outwardly flared conical portion axially aligned with said hole in said restraint cushion, a plurality of stud members radially extending from said diffuser and passing through the restraint cushion for rigidly connecting the diffuser to said base wall so as to locate said conical portion of said diffuser concentrically and in spaced relationship with respect to said enlarged opening in said one of said end walls, a gas generator positioned in said tubular diffuser, said gas generator having a threaded stud at one end thereof that extends through the other of said side walls of said restraint cushion and through said aperture in said other end wall of said housing, a conical flange formed at the other end of said gas generator and being located in said hole in the restraint cushion, and a nut on the threaded stud which upon tightening causes the conical flange to be drawn towards and cooperate with said conical portion of the diffuser for clamping the material of the restraint cushion surrounding said hole between said conical flange and said conical portion and simultaneously traps a portion of the material of the other of said side walls of the restraint cushion between said other end wall of the housing and said one end of the gas generator.

3. An occupant restraint system comprising, in combination, an elongated housing adapted to be fixedly mounted on a motor vehicle, said housing including a J-shaped base wall connected to a pair of laterally spaced end walls, one of said end walls having an enlarged circular opening formed therein and the other end wall having an aperture formed therein, a restraint cushion having a pair of laterally spaced side walls one of which is formed with a plurality of slits so as to define a hole therein, an elongated tubular diffuser located within said restraint cushion and being positioned in the housing between the end walls, one end of said diffuser being formed with a radially outwardly flared conical portion axially aligned with said hole in said restraint cushion and the other end of said diffuser being formed with integral guide means, a plurality of stud members radially extending from said diffuser and passing through the restraint cushion for rigidly connecting the diffuser to said base wall so as to locate said conical portion of said diffuser concentrically and in spaced relationship with respect to said enlarged opening in said one of said end walls, a gas generator positioned in said tubular diffuser, said gas generator having a threaded stud at one end thereof that extends through the other of said side walls of said restraint cushion and through said aperture in said other end wall of said housing, a conical flange formed at the other end of said gas generator and being located adjacent said enlarged opening in said other end wall of said housing and in said hole in the restraint cushion, said guide means serving to locate said one end of said gas generator in said diffuser to as to align said threaded stud with said aperture, and a nut on the threaded stud which upon tightening causes the conical flange to be drawn towards and cooperate with said conical portion of the diffuser for clamping the material of the restraint cushion surrounding said hole between said conical flange and said conical portion and simultaneously traps a portion of the material of the other of said side walls of the restraint cushion between said other end wall of the housing and said one end of the gas generator.

4. A method of connecting a restraint cushion to a diffuser-gas generator combination wherein the diffuser is tubular in configuration and has one end thereof formed with an outwardly flared conical portion and wherein the gas generator is cylindrical in configuration and has one end thereof formed with a conical flange and the other end provided with a threaded stud, said method comprising the steps of cutting a plurality of slits in one side wall of the restraint cushion so as to form a hole therein defined by a plurality of circumferentially spaced flap members, placing the diffuser within the restraint cushion and positioning the conical portion of the diffuser in axial alignment with said hole, folding the restraint cushion into a compact package that permits the restraint cushion and diffuser to be positioned within a support housing having laterally spaced end walls one of which has an enlarged opening formed therein and the other of which has an aperture formed therein, securing the diffuser to the housing so that the conical portion of the diffuser registers with the enlarged opening in the one end wall of the housing and the other end of the diffuser is concentrically located relative to the aperture in the other end wall, forming an opening in the other side wall of the restraint cushion in axial alignment with said aperture in the other end wall of the housing, inserting the gas generator into the diffuser so as to cause the threaded stud to pass through the opening in the other side wall of the restraint cushion and through the aperture in the other end wall, and securing the gas generator to the other end wall so as to trap a portion of the restraint cushion between said other end wall and the other end of the gas generator while simultaneously clamping said flap members between the conical portion of the diffuser and the conical flange of the gas generator.

* * * * *